United States Patent Office 3,484,373
Patented Dec. 16, 1969

3,484,373
REACTION PRODUCT OF OLEFIN AND PHOSPHORUS HALIDE IN THE PRESENCE OF FRIEDEL-CRAFTS CATALYSTS
John Frederick Ford and John Michael Wood, Sunbury-on-Thames, England, assignors to The British Petroleum Company Limited, London, England, a British joint-stock corporation
No Drawing. Original application Mar. 19, 1964, Ser. No. 353,269, now Patent No. 3,397,219, dated Aug. 13, 1968. Divided and this application Dec. 6, 1967, Ser. No. 703,503
Claims priority, application Great Britain, Mar. 29, 1963, 12,510/63, 12,512/63
Int. Cl. C10m 1/44
U.S. Cl. 252—32.5     2 Claims

ABSTRACT OF THE DISCLOSURE

Lubricating compositions are provided comprising a lubricating base oil and a polymeric additive, the polymeric additive being prepared by a combined phosphorylation/polymerisation reaction of an alpha-olefin with a phosphorus halide in the presence of a Friedel-Crafts catalyst, the olefin being present in at least a 10:1 molar excess over the phosphorus halide, and the Friedel-Crafts catalyst being in at least a 1.5:1 molar excess over the phosphorus halide.

---

This application is a division of our co-pending application, Ser. No. 353,269, filed Mar. 19, 1964, now Patent No. 3,397,219.

This invention relates to the preparation of phosphorus-containing olefin polymers suitable for use as additives for improving the viscosity index and detergent/dispersant properties of lubricating oils, and to lubricating compositions containing such polymers.

According to the invention, a liquid phosphorus-containing olefin polymer is prepared by reacting an olefin, preferably an alpha olefin having up to 20 carbon atoms, with a phosphorus halide, preferably chloride or bromide, the molar ratio of olefin to phosphorus halide being 100:0.1–25, preferably 100:2–10, in the presence of at least 1.5 moles of a Friedel Crafts catalyst per mole of phosphorus halide and at a temperature below 0° C. so as to produce a phospho-halogenated polymer, and hydrolysing the latter compound to convert halogen groups present in the polymer to oxygen or hydroxyl groups.

In order to produce products that are liquid at normal ambient temperatures, it will be necessary in most cases to carry out the phosphorylation/polymerisation reaction at a temperature above −60° C. Suitable Friedel Crafts catalysts include aluminium chloride, zinc chloride, antimony chloride, ferric chloride, stannic chloride, titanium chloride, boron trifluoride and hydrogen fluoride. Aluminium chloride is preferred.

It is not necessary to use more than two moles of catalyst per mole of phosphorus halide in order to obtain the desired product.

Suitable alpha olefins are the methyl-substituted butenes, pentenes and hexenes.

The hydrolysis reaction may conveniently be carried out by adding water to the phospho-halogenated polymer and refluxing. The hydrolysis is complete when the acidity of the reaction mixture ceases to increase.

The reaction is preferably carried out in an inert solvent such as a chlorinated hydrocarbon, e.g. methylene chloride, ethyl chloride, ethyl bromide or carbon tetrachloride.

According to a further feature of the invention, the hydrolysed phosphorus-containing polymer produced as described above may be reacted with a basic compound, e.g. a hydroxide, oxide or alkaline-reacting salt of an alkaline earth metal, alkali metal or aluminium, to produce a neutral product which is more suitable for use as a lubricating oil additive. This neutralisation step may be carried out by adding excess of the basic compound, e.g. 2–4 times the required amount based on the neutralisation value of the polymer, and refluxing the reactants in an inert solvent, e.g. one of the solvents mentioned above or, in this case, a hydrocarbon solvent, e.g. n-heptane. Alternatively, where there is used in the phosphorylation/polymerisation reaction, a Friedel Crafts catalyst that can easily be converted into a basic compound, the neutralisation step may be carried out in situ. For example, where aluminium chloride is used as the catalyst, after the hydrolysis reaction the aqueous layer may be neutralised with ammonia to convert the aluminium chloride to aluminium hydroxide and the mixture then refluxed to neutralise the polymer.

The invention also includes phosphorus-containing olefin polymers, or salts thereof, prepared as described above.

The invention further includes lubricating compositions consisting essentially of a major proportion of a lubricating base oil (which may be mineral or synthetic) and a minor proportion, e.g. 0.1 to 25%, especially 1–10%, by weight of the composition, of a phosphorus-containing olefin polymer, or a salt thereof, as specified above.

The preparation of three polymers according to the invention (Polymers MW7 (a), MW7 (b) and MW8 (a)) will now be described by way of example.

POLYMER MW7(a)

The following reactants were used:

4-methylpentene-1 (4–MP–1), (100 mole percent) _____ g__ 40.93
AlCl$_3$ (10 mole percent) _____ g__ 6.497
PCl$_3$ (5 mole percent) _____ cc__ 2.15

A mixture of 200 cc. methylene chloride, 6.497 g. AlCl$_3$ and 2.15 cc. PCl$_3$ was cooled to −40° C. under a nitrogen atmosphere. 4–MP–1 was added slowly with stirring and some reaction occurred. After addition of about 15 g. of 4–MP–1 in this way, the rate of addition was speeded up by adding it in portions of about 5 g. A temperature gradient of 30° C. was obtained but the flask contents were not allowed to rise above −20° C. Polymer separated out in the vessel. After complete addition of the 4–MP–1, stirring was continued for a further 2 hours, allowing the contents of the flask to warm up to 0° C.

The solution was then left overnight and by the following morning was found to have turned from a slight yellow colour to brown.

About 50 cc. water and 100 cc. CCl$_4$ were added and the mixture refluxed for 1½ hours to complete the hydrolysis. The organic phase was separated, washed three times with water, dried over anhydrous Na$_2$SO$_4$ and evaporated on a water bath under reduced pressure.

The residual polymer was then heated to 200° C. at a pressure of 0.05–0.02 mm. Hg until no further light distillate was obtained. A nitrogen bleed was used.

The product was a very viscous polymer, slightly cloudy and of a pale brown colour.

POLYMER MW7(b)

Reactants:
4–MP–1 (100 mole percent) _____ g__ 42.8
AlCl$_3$ (10 mole percent) _____ g__ 6.796
PCl$_3$ (5 mole percent) _____ cc__ 2.20

The reaction was carried out substantially as for MW7 (a) except that the initial mixture was cooled to −50° C.

Addition of 4—MP—1 produced no temperature increase and eventually all the monomer had been added. There was then a very rapid reaction after a further delay of 15 min. and the temperature rose but was quickly reduced to −30° C. Polymer was formed. In this case there was no delay between the end of the reaction and the addition of water. The hydrolysis reaction and working up of the product was carried out as for MW7 (a) and the final product was a viscous polymer faintly cloudy and of a pale yellow colour.

POLYMER MW8 (a)

3.2 g. of Polymer MW7 (a) were dissolved in n-heptane (100 ml.). $Ba(CH)_2 \cdot 8H_2O$ (0.325 g.: i.e. three times the amount required for neutralisation) was added and the mixture refluxed for one hour, dried with anhydrous $Na_2SO_4$, filtered and evaporated.

The product was a pale brown viscous liquid, similar in appearance to the parent polymer. It had a barium:phosphorus ratio of 1:4 which is in agreement with the neutralization value of the parent (unneutralised) polymer MW7 (a) which had a hydroxyl:phosphorus ratio of 1:2.

The properties of polymers MW7 (a), MW7 (b) and MW8 (a) are given in the table below. The base oil used for the viscosity and viscosity index tests was a fully refined lubricating oil obtained from a Middle East crude oil.

The carbon sedimentation test gives an indication of the detergent/dispersant properties of the polymers by measuring their ability to retard this settling of a suspension of carbon black in n-heptane. In this test 0.05 g. of the material to be tested are weighed in a test-tube 6″ x ½″ and 10 ml. n-heptane added; the material is dissolved by heating if necessary. 0.1 g. American Carbon Black "Kosmos BB" is added to the solution which is shaken vigorously and allowed to stand overnight. The next day the test-tube is inverted 10 times and the rate at which the carbon black falls to the bottom of the test-tube assesses the dispersant properties of the material. Comparative assessments are done by measuring the time taken for carbon black layer to fall below 1.2 cm. in height. The height of the solution at the beginning is 7.5 cm. Without an additive, the time for settling of the carbon black to 1.2 cm. was approximately one minute and with 0.05 g. poly 4-methylpentene-1 it was approximately 10 minutes.

The effectiveness of the polymers according to the invention in regard to VI-improvement and detergent/dispersant properties is clearly demonstrated by the results shown in the table.

TABLE

| | MW7 (a) | | MW7 (b) | | MW8 (a) | |
|---|---|---|---|---|---|---|
| Phosphorus content, percent wt | 1.35 | | 1.34 | | 1.2 | |
| Barium content, percent wt | Nil | | Nil | | 1.34 | |
| Neutralisation values, mg. KOH/g. polymer | 11.9 | | 12.0 | | | |
| | 38° C. | 99° C. | 38° C. | 99° C. | 38° C. | 99° C. |
| Kinematic Viscosity (centistokes): | | | | | | |
| No polymer | 45.64 | 6.2 | 45.64 | 6.2 | 45.64 | 6.2 |
| 2% wt. polymer | 53.33 | 7.46 | 54.75 | 7.64 | 52.76 | 7.46 |
| 4% wt. polymer | 65.15 | 8.80 | 68.77 | 9.16 | 64.23 | 8.73 |
| Viscosity Index: | | | | | | |
| No polymer | 103 | | 103 | | 103 | |
| 2% wt. polymer | 110 | | 112 | | 112 | |
| 4% wt. polymer | 116 | | 116 | | 116 | |
| Carbon Sedimentation Test (minutes): | | | | | | |
| No polymer | 1 | | 1 | | 1 | |
| 0.05 g. polymer | 530 | | 300 | | 1,800 | |

We claim:

1. A lubricating composition consisting essentially of a lubricating oil and from 0.1% to 25% by weight of the composition of a phosphorus-containing olefin polymer prepared by reacting an alpha olefin having up to twenty carbon atoms with a phosphorus halide in the molar ratio of 100 parts of olefin to 2 to 10 parts of phosphorus halide, in the presence of at least 1.5 moles of a Friedel-Crafts polymerisation catalyst per mole of phosphorus halide and at a temperature within the range of 0° C. to −60° C. to produce a phospho-halogenated polymer and, thereafter hydrolyzing the polymer.

2. A lubricating composition consisting essentially of a lubricating base oil and from 0.1% to 25% by weight of a salt of a phosphorus-containing olefin polymer, prepared by reacting an alpha olefin having up to twenty carbon atoms with a phosphorus halide in the molar ratio of 100 parts of olefin to 2 to 10 parts of phosphorus halide, in the presence of at least 1.5 moles of Friedel-Crafts polymerisation catalyst at a temperature within the range of 0° C. to −60° C. to produce a phospho-halogenated polymer, hydrolyzing the phospho-halogenated polymer, and thereafter neutralizing said hydrolyzed polymer with a basic compound selected from the group consisting of hydroxides, oxides, alkaline-reacting salts of alkaline earth metals, alkali metals, and aluminium.

References Cited

UNITED STATES PATENTS 3,179,689  4/1965  Gould _____ 252—49.8
3,232,883  2/1966  Le Suer _____ 252—32.5

DANIEL E. WYMAN, Primary Examiner

I. VAUGHN, Assistant Examiner

U.S. Cl. X.R.

252—49.8

PO-1050
(5/69)

UNITED STATES PATENT OFFICE
CERTIFICATE OF CORRECTION

Patent No. __3,484,373__     Dated __December 16, 1969__

Inventor(s) __John Frederick Ford et al__

It is certified that error appears in the above-identified patent and that said Letters Patent are hereby corrected as shown below:

Column 3, line 31, change "$Ba(CH)_2$" to -- $Ba(OH)_2$ --

Column 3, line 47, change "this" to -- the --

SIGNED AND
SEALED
JUL 7 1970

(SEAL)
Attest:

Edward M. Fletcher, Jr.
Attesting Officer

WILLIAM E. SCHUYLER, JR.
Commissioner of Patents